United States Patent
Lewis et al.

(10) Patent No.: US 10,445,312 B1
(45) Date of Patent: Oct. 15, 2019

(54) SYSTEMS AND METHODS FOR EXTRACTING SIGNAL DIFFERENCES FROM SPARSE DATA SETS

(71) Applicant: Google Inc., Mountain View, CA (US)

(72) Inventors: Justin Lewis, Marina Del Ray, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 15/294,267

(22) Filed: Oct. 14, 2016

(51) Int. Cl.
  *G06F 17/30* (2006.01)
  *G06F 16/23* (2019.01)
  *G06F 16/22* (2019.01)
  *G06F 16/21* (2019.01)

(52) U.S. Cl.
  CPC ........ *G06F 16/2365* (2019.01); *G06F 16/211* (2019.01); *G06F 16/22* (2019.01)

(58) Field of Classification Search
  CPC ........ G06F 17/30292; G06F 17/30312; G06F 17/30371; G06F 17/30563; G06F 17/30569; G06F 16/2365; G06F 16/211; G06F 16/22
  USPC ................. 707/607, 802, 807, 809, 810, 811
  See application file for complete search history.

(56) References Cited

U.S. PATENT DOCUMENTS

| | | | |
|---|---|---|---|
| 6,292,793 B1* | 9/2001 | Lehtinen | H04M 3/36 |
| 7,904,471 B2* | 3/2011 | Aggarwal | H04L 63/0407 707/744 |
| 2004/0093192 A1* | 5/2004 | Hasson | A61B 5/044 703/1 |
| 2013/0307524 A1* | 11/2013 | Shavitt | G01R 23/02 324/76.39 |
| 2014/0163991 A1* | 6/2014 | Short | G10L 21/0272 704/258 |
| 2017/0207916 A1* | 7/2017 | Luce | H04L 9/14 |

\* cited by examiner

*Primary Examiner* — Greta L Robinson
(74) *Attorney, Agent, or Firm* — Foley & Lardner LLP (57) ABSTRACT

The present disclosure provides systems and methods for extracting signal differences from sparse data sets. Data sets for comparison, including a control data set and one or more test data sets, may be normalized and separated into subsets or groupings via a MapReduce function. Normalization may account for large values present in both control and test data sets that would otherwise reduce the significance of smaller correlated values, creating false negatives. The MapReduce may provide identification and analysis of correlations between sets via related entities. Accordingly, via the systems and methods discussed herein, a computing device may extract statistically significant differences between data sets, without requiring extensive entity by entity comparison (or entity to every entity comparison, which, for a data set of millions of entities, may be too computationally expensive or take too long), reducing memory footprint and processor requirements.

20 Claims, 5 Drawing Sheets

SYSTEMS AND METHODS FOR EXTRACTING SIGNAL DIFFERENCES FROM SPARSE DATA SETS

BACKGROUND

A data set comprising one or more values for one or more entities may be considered dense or sparse, depending on the distribution of the values across the entities. For example, if most of the non-zero values are clustered together among neighboring or nearby entities, the data may be considered dense. Conversely, if non-zero values are widely separated or rare, with most of the values being zero or null, the data may be considered sparse. It may be difficult to analyze or compare sparse data sets, as average values across a region may be very low due to the large number of intervening null values. This may be further compounded with very large and sparse data sets, where only a relatively few entities have non-null values, and those values are very low. For example, performing individual comparisons between many thousands or millions of entity values may take significant amounts of memory and processing time, as well as processor-memory bandwidth. The comparisons may also result in a high rate of false positives or negatives with significant signals being difficult to extract, due to the sparsity of the data and low values relative to average values.

SUMMARY

Data sets for comparison, including a control data set and one or more test data sets, may be normalized and separated into subsets or groupings via a MapReduce function. Normalization may account for large values present in both control and test data sets that would otherwise reduce the significance of smaller correlated values, creating false negatives. The MapReduce may provide identification and analysis of correlations between sets via related entities. Accordingly, via the systems and methods discussed herein, a computing device may extract statistically significant differences between data sets, without requiring extensive entity by entity comparison (or entity to every entity comparison, which, for a data set of millions of entities, may be too computationally expensive or take too long), reducing memory footprint and processor requirements.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

A data set comprising one or more values for one or more entities may be considered dense or sparse, depending on the distribution of the values across the entities. For example, if most of the non-zero values are clustered together among neighboring or nearby entities, the data may be considered dense. Conversely, if non-zero values are widely separated or rare, with most of the values being zero or null, the data may be considered sparse. It may be difficult to analyze or compare sparse data sets, as average values across a region may be very low due to the large number of intervening null values. For example, given a data set with 1000 entities having 990 null value entities and 10 entities with values between 1 and 10 (with an average of 5), an average for the entire data set is 0.05. Accordingly, even the lowest value of 1 is 20 times larger than the average and may appear significant.

If the data set is dense, it may be divided into regions and analyzed separately. In a most extreme example, the 10 entities may be adjacent. Dividing the region into an arbitrary number of smaller regions, such as 20 regions of 50 entities, may result in 19 regions with only null values. An average for the remaining region may then be 1. This may help with the analysis, reducing the significance of smaller values and preventing false positives.

If a data set is sparse, however, with many null value entities separating non-null value entities, the above approach may not work. For example, performing individual comparisons between many thousands or millions of entity values may take significant amounts of memory and processing time, as well as processor-memory bandwidth. The comparisons may also result in a high rate of false positives or negatives with significant signals being difficult to extract, due to the sparsity of the data and low values relative to average values.

Figure 1A:
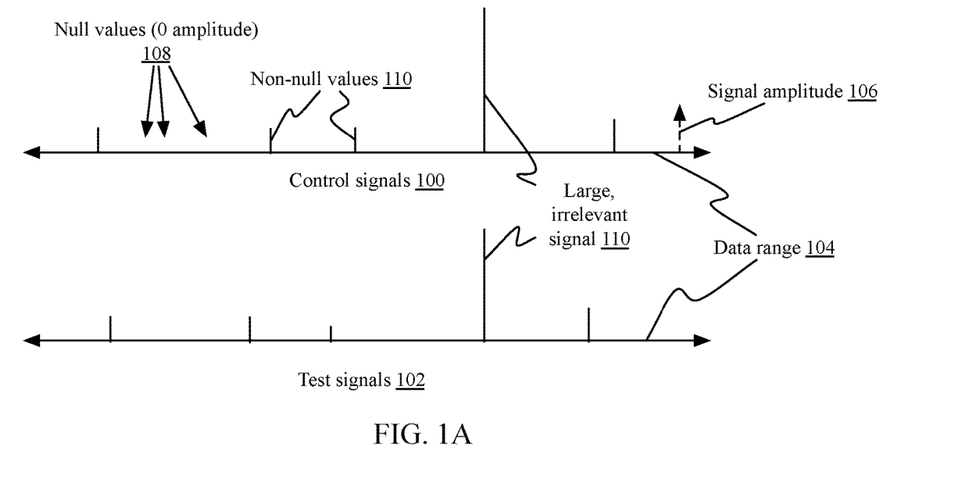
FIG. 1A is an illustration of two sparse data sets, comprising a control set and a test set, according to one implementation.

For example, referring briefly to FIG. 1A, illustrated are two example data sets, comprising control signals 100 and test signals 102. Each data set may signal amplitudes 106 for a plurality of entities across a data range, such as null values 108 (e.g. having zero amplitude) and non-null values 110. Data sets 100, 102 may be of any type and form, including signal amplitudes across a range of frequencies; pixel brightness across a rasterized stream; audience measurement or impression counts across a range of media items, etc. In many implementations, the data range 104 may comprise thousands, tens of thousands, hundreds of thousands, millions, tens of millions of entities, or even more. Typical signal amplitudes 106 may be orders of magnitude lower, in the range of thousands, hundreds, tens, or lower. In some implementations, the data sets may also include a large signal 110 that may be correlated between the two data sets. In instances of attempting the extract statistically significant differences between the sets, the large signal 110, being common to both sets, may be irrelevant to differences. However, including the signal 110 in calculations across a region (e.g. in determinations of averages) may result in missing statistically significant differences in lower amplitude signals.

Figure 1B:
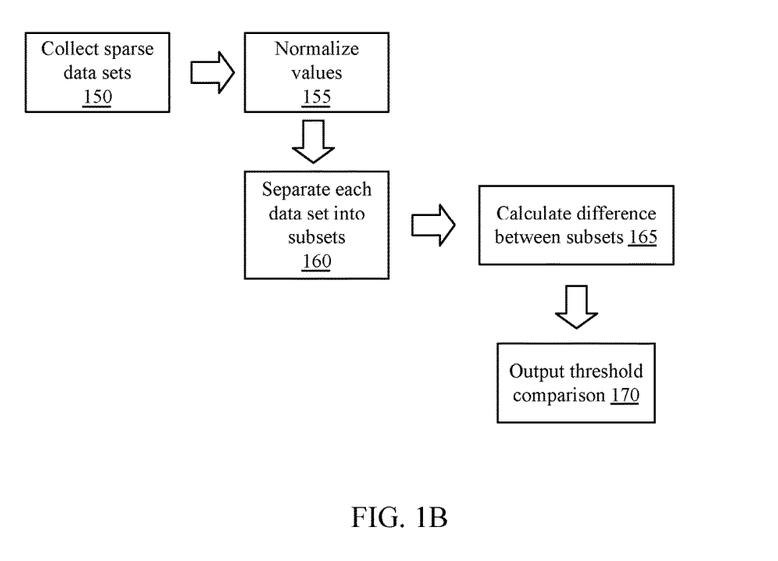
FIG. 1B is a block diagram of a process for extracting signal differences from sparse data sets, according to one implementation.

Accordingly, an implementation of a process for extracting signal differences from sparse data sets as shown in FIG. 1B may be applied. At step 150, data sets for comparison, including a control data set and one or more test data sets, may be collected. The data sets may be normalized at step 155, either broadly or across the entire data range 104 in some implementations; or across sub regions in other implementations. Normalization may account for large values present in both control and test data sets that would otherwise reduce the significance of smaller correlated values, creating false negatives. In some implementations, the data may be separated into a plurality of subsets at step 160 via a MapReduce function. The MapReduce may reduce the data sets to smaller related sets of entities having non-null values. For example, the MapReduce may comprise filtering null values from the data set and counting a sum of entities within a subset. This may allow for identification and analysis of correlations and differences between the subsets at step 165. Once a subset with a statistically significant difference is identified, it may be added to an output set at step 170. The output sets may be used for further processing, such as tuning a bandpass filter to a detected significant frequency, reducing noise levels; selecting additional media for distribution based on a detected rise in interest in a genre or set; aggregating significant signals from noise for cryptographic analysis; etc. Accordingly, via the systems and methods discussed herein, a computing device may extract statistically significant differences between data sets, without requiring extensive entity by entity comparison, reducing memory footprint and processor requirements compared to full entity to entity comparisons.

Figure 2:
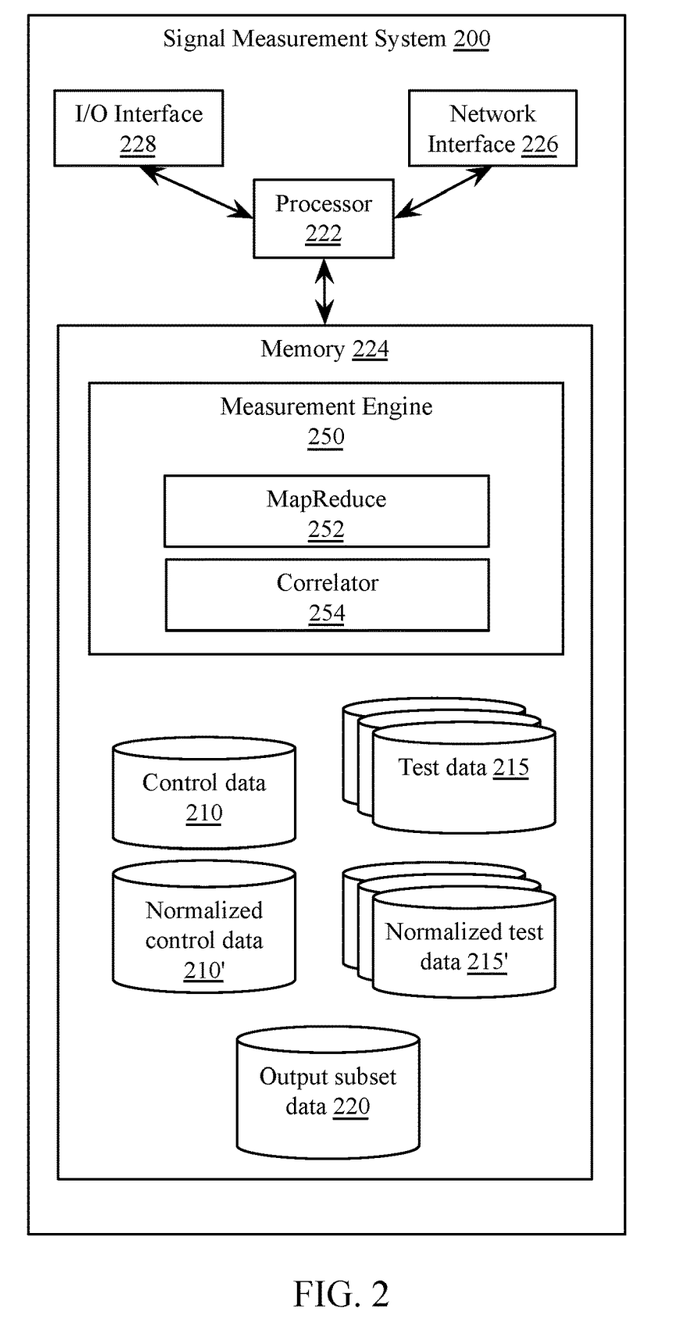
FIG. 2 is a block diagram of a system for extracting signal differences from sparse data sets, according to one implementation.

FIG. 2 is a block diagram of a system 200 for extracting signal differences from sparse data sets, according to one implementation. System 200 may comprise a desktop computing device, server computing device, laptop computing device, workstation, portable computer, wearable computer, rackmount computer, or any other type and form of computing device. In some implementations, the system may comprise a processor 222, network interface 226, input/output interface 228, and memory 224, among other elements. Although shown combined in a single device, in many implementations, one or more components of the signal measurement system 200 may be distributed across a plurality of computing devices. For example, components in memory 224 may be stored in one or more external storage devices, content servers, database servers, etc. System 200 may thus comprise a plurality of computing devices, including one or more physical devices, one or more virtual computing devices executed by one or more physical devices, or a combination of virtual and physical computing devices.

In many implementations, system measurement system 200 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C#, Java, JavaScript, Perl, HTML, XML, Python and Visual Basic.

System measurement system 200 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, system measurement system 200 may include a plurality of network interfaces 226 of different types, allowing for connections to a variety of networks or a network such as the Internet via different sub-networks.

System measurement system 200 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of system measurement system 200, such as a built-in display, touch screen, microphone, etc., or external to the housing of system measurement system 200, such as a monitor connected to system measurement system 200, a speaker connected to system measurement system 200, etc., according to various implementations.

System measurement system 200 may include in memory 224 a measurement engine 250 or may execute a measurement engine 250 with a processor 222. Measurement engine 250 may be an application, applet, script, service, daemon, routine, or other executable logic for receiving, filtering, correlating, and identifying statistically significant signals in sparse data sets. Measurement engine 250 may receive, via network interface 226, data sets for measurement. In some implementations, data sets may be pre-compiled or aggregated or sourced from another device. In other implementations, measurement engine 250 may receive signals of data sets and aggregate them, via a signal aggregator executed by the measurement engine, into control and data sets 210, 215 respectively. For example, in one such implementation, measurement engine 250 may receive data signals from a plurality of client devices (e.g. measurement pings sent responsive to loading of content or via a client agent), each signal comprising an identifier of the client device. The measurement engine 250 or a signal aggregator of the measurement engine may sort and aggregate the data signals into data sets 210, 215 based on the client identifiers (e.g. for a test group and control group, as discussed above).

As discussed above, data signals may be stored as control data set 210 and test data set(s) 215, such as test data sets for a plurality of test groups. Data sets 210, 215 may be stored in any type and form of storage format, and may comprise concatenated data strings, a database, a data array, a flat file, or any other format or protocol. For example, in one implementation, data sets 210, 215, may comprise a string of values, each representing an amplitude value for a corresponding entity. In a sparse data set comprising a large number of null values, such a string may be easily compressed.

Measurement engine 250 may execute a normalization function to normalize non-null values within a data set, reducing the effect of large, irrelevant data signals. In one implementation, normalization may comprise calculating a sum of all of the amplitudes within one more data sets, and dividing each entity value in a dataset by the sum. In another implementation, normalization may comprise calculating a logarithm of an entity value to a base of a sum of the amplitudes within the one or more data sets. Normalized data sets may be stored separately, e.g. 210', 215', in some implementations, to preserve the original data sets if necessary.

In some implementations, measurement engine 250 may execute a MapReduce function 252 to partition data sets 210, 215, or normalized data sets 210', 215'. MapReduce function 252 may comprise an application, service, server, daemon, or other executable logic for mapping and aggregating (e.g. reducing) a data set. The data sets may be partitioned into a plurality of subsets. First, in some implementations such as where data is aggregated from a plurality of sources and aggregated, the aggregated data may include a plurality of entries corresponding to entities within the data range. For example, a plurality of data sources may provide identifications of entities, some which may be the same. The data may be aggregated together, resulting in some duplicate identifications of entities. For example, a plurality of network security appliances may calculate results of hash functions for payloads of packets traversing the appliances. These hash results may be provided to the measurement engine. While most of the hashes will likely be different, some packet hashes may be identical. After aggregating these hash results, the MapReduce function may increment a counter for each identified hash, and output a list of unique hash results and counter values (most of which will be 1, but some of which may be higher). The same technique may be applied to any other aggregated data set, including counts of carrier detections at different frequencies within a range, pixel values in an array, detections of events from an array of sensors (e.g. particle detectors, etc.), counts of unique visitors to websites or retrieval of content by unique devices, or any other such data. Most of the data set may have null values or values of one, but the MapReduce function may aggregate and count other values for entities within the data range.

In some implementations, the MapReduce function 252 may partition the aggregated data sets into a plurality of subsets. Subsets may be predetermined across the data range, such as subdivisions of frequency ranges, sets of detectors, related websites, related genres of media content, or any other type of associated or related data. The subsets may be contiguous within the data range, such as a subdivision of a frequency range into octaves (e.g. from a first frequency f to 2f then 2f to 4f 4f to 8f etc.) or linear sets (e.g. from 100 MHz to 200 MHz, 200 MHz to 300 MHz, 300 MHz to 400 MHz, etc.); or websites having IP addresses of x.y.z. [0-255] or media content with identifiers 1-100, 101-200, 201-200, etc. In other implementations, the subsets may be non-contiguous, such as harmonically related frequencies (e.g. 100 Hz, 200 Hz, 300 Hz, 400 Hz, etc., excluding 101-199 Hz, 201-299 Hz, 301-399 Hz, etc.); websites at different URLs, but all including "example.html"; content items with various identifiers but all in the same predetermined genre or having the same creation date; etc. In some implementations, the normalized data values within each subset may be aggregated or counted together, incrementing a counter for each subset according to the normalized values. The resulting count may be compared by a correlator 254 to a corresponding count for a subset in a control data set or a test data set, and a difference determined. Correlator 254 may comprise an application, service, server, daemon, or other executable logic for determining a difference or calculating a correlation between two data sets or subsets. The calculated difference may comprise a difference between the counts, or may comprise a correlation coefficient. If the difference is above a threshold (e.g. 1, 5, 10, 20, etc., depending on implementation of normalization) or correlation coefficient (e.g. p-value) is less than a threshold (e.g. 0.05), then the subset may be considered statistically significant, and may be added to an output data 220 of statistically significant subset data ranges. In a further implementation, each entity may have an associated coefficient or weight for scoring within the subset. For example, a fundamental frequency f may have a weight of 1, a first harmonic 2f may have a weight of 0.5, a second harmonic 3f may have a weight of 0.25, etc.; or media content within a genre may be associated with a coefficient or weight corresponding to how closely the content fits within the genre. In some implementations, the normalized counts for each entity may be multiplied by, or replaced with, the coefficient or weight associated with the entity. As discussed above, aggregated scores for each subset may be compared by correlator 254 between test data and control data, and identifications of statistically significant subsets may be added to output data 220.

Figure 3:
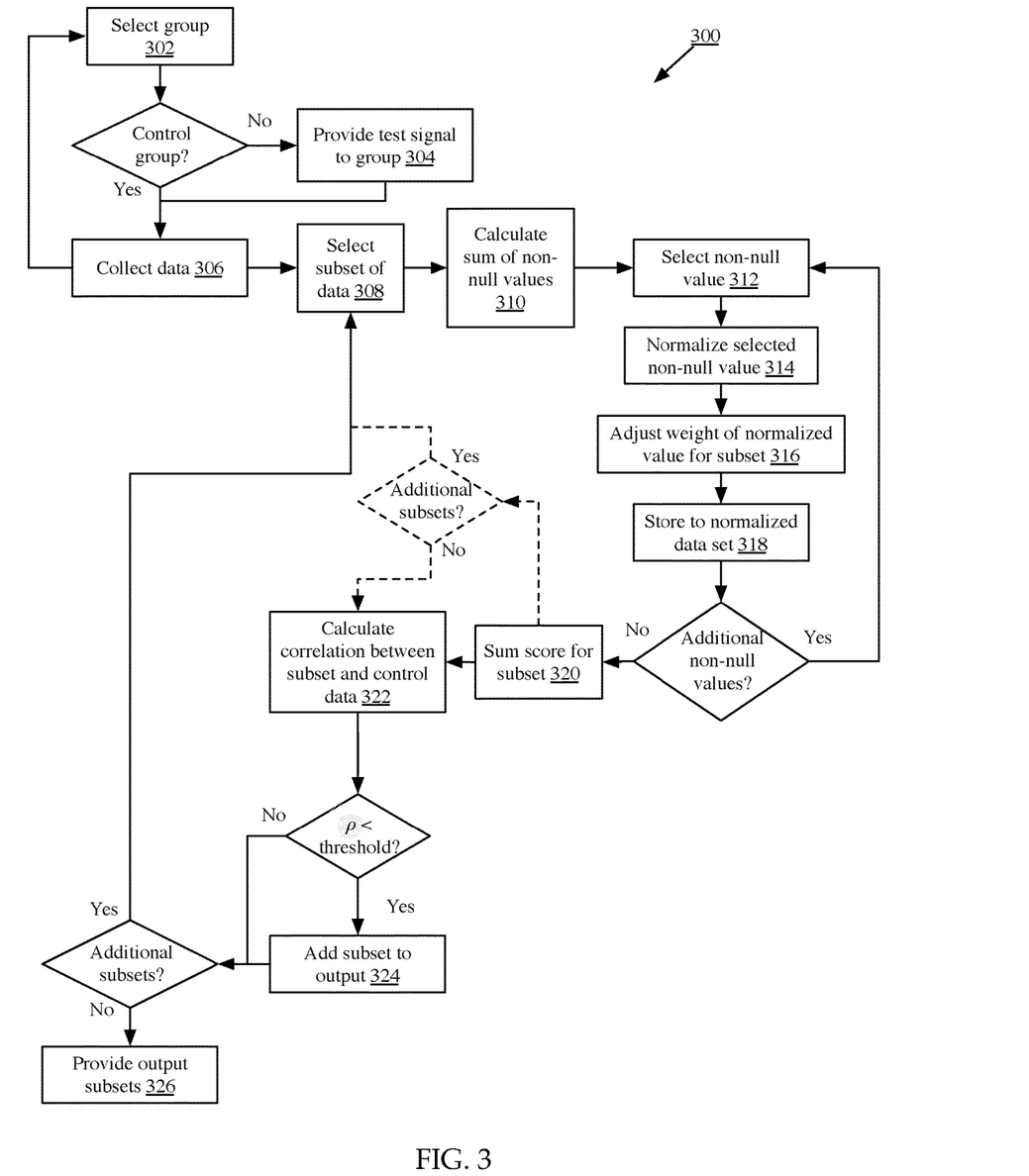
FIG. 3 is a flow chart of a process for extracting signal differences from sparse data sets, according to one implementation.

FIG. 3 is a flow chart of a process 300 for extracting signal differences from sparse data sets, according to one implementation. At step 302, in some implementations, a group may be selected. If the group is not a control group, then a test signal may be provided to the group at step 304. For example, in some implementations, a group may comprise a group of users or devices, and a test signal may be content provided to the test group of users or devices (and not provided to the control group). In other implementations, a group may comprise a group of sensor readings before and after activation of an experimental source. Accordingly, control groups and test groups may be divided temporally, physically or logically, or both temporally and physically or logically.

In some implementations, devices or readings may be added to a group randomly, rather than preselecting a group. For example, in one such implementation, a device may request an item of content from a content server. At step 302, the device may be randomly added to either a control group or test group, and responsive to the selection, may either receive the requested item of content or a different item of content under test (or, in some implementations, the requested item of content and a different item of content under test). Readings or data may be collected at step 306 and steps 302-306 iteratively repeated until a sufficient number of readings or data entries are collected. For example, data regarding whether a device fully consumed an item of content may be collected at step 306. Once a predetermined number of devices have requested the content and/or been provided with content or additional content, as discussed above, such as 100 devices, 1000 devices, or any other such number, the method 300 may proceed to process the collected data sets. In other implementations, method 300 may continue after each collection of data, such as where a set of data is collected from a plurality of sources simultaneously (e.g. from sensors in a particle detector, or from a log from a network appliance).

At step 308, in some implementations, a subset of the data may be selected. The subset may be predetermined as discussed above, and may be contiguous or non-contiguous. In some implementations, the subset may correspond to frequency ranges or harmonics, Internet Protocol addresses or protocols, media content types or genres, or any other such information.

At step 310, the system may calculate a sum of the non-null values. The sum may be calculated across the subset or across the entire data set, depending on the implementation. As discussed above, the sum may be used in normalizing the data to filter out spurious high amplitude signals.

At step 312, the system may select a first non-null value within a subset. The value may be selected from lowest to highest entity within the subset data range, highest to lowest, or any other method. At step 314, the system may normalize the selected non-null value. As discussed above, in some implementations, normalizing the value may comprise dividing the value by the sum of the non-null values; calculating a logarithm of the value to a base of the non-null values; or any other such normalization algorithm. In one implementation, for example, a threshold may be determined based off the sum of the non-null values, such as an average, and non-null values exceeding the average (or twice the average, or 1.5 times the average) may be reduced to such a threshold.

At step 316, in some implementations, the system may adjust the normalized value according to a weighting system. For example, the associated entity in the subset may have a corresponding weight or score, as discussed above, such as a score based on relationship to a genre for the subset, a score based on a harmonic relationship of frequencies within the subset, a score based on position within the subset (e.g. where the subset represents pixels across a line within an image and pixels towards the center are more heavily weighted), or any other such relationship. The normalized value may be multiplied by the weight or score to result in a weighted, normalized score for the entity. In other implementations, no weights may be applied or all entities within a subset may be weighted with a value of 1.

If additional non-null values within the subset exist, then steps 312-318 may be iteratively repeated for each non-null value. Otherwise, at step 320, the system may aggregate or sum the weighted, normalized scores for the subset. In some implementations, the system may increment a counter according to each weighted, normalized score. In some implementations, the system may calculate a running total at step 318 during each iteration of steps 312-318.

In some implementations, after step 320, steps 308-320 may be repeated for additional subsets of the data set, as shown in dashed line. Furthermore, although steps 308-326 are shown for a single data set for clarity, these steps may be run in series or in parallel on a plurality of data sets, such as a control data set and one or more test data sets. Steps 308-320 may also be repeated for subsets of other data sets. In other implementations, steps 308-320 may be performed for all subsets of a control data set first, and then performed at a subsequent time on test data sets, including on test data obtained subsequent to processing of the control data. In such implementations, test data subset correlation scores may be calculated immediately after determining the score for the test data subset.

At step 322, the system may calculate a correlation between the subset and a subset of a corresponding control or test data set. As discussed above, the control data and test data set or sets may be divided into subsets in a common scheme. Accordingly, each subset may correspond to subsets in other data sets (e.g. test or control data sets). The system may calculate a difference or correlation between the weighted, normalized scores for the data set. In one implementation, the system may simply subtract one weighted, normalized score from the other to generate a difference score. If the difference score is greater than a predetermined threshold, then at step 324, an identification of the subset may be added to an output data set. In another implementation, the system may calculate a p-value from the weighted, normalized scores for a plurality of subsets (which may or may not include all of the subsets) in the test data and control data (e.g. calculating a mean and standard deviation for subset scores in each of the data sets, and then calculating a Pearson correlation coefficient based on the calculated mean and standard deviations). If the p-value is less than a threshold, then an identification of the subsets from the test data set may be added to an output data set at step 324. In a further implementation, if the p-value is less than a threshold, then the system may identify any subset in the test data having a weighted, normalized score greater than one or more standard deviations from the mean, and may add an identification of the corresponding subset to the output data set at step 324. Steps 322-324 may be repeated iteratively for each additional subset (including, in some implementations, steps 308-324). At step 326, the identified subsets may be provided as an output data set.

Accordingly, in one aspect, the present disclosure is directed to a method for extracting signal differences from a sparse data set signal. The method includes generating, by a signal aggregator executed by a measurement engine of a computing device, a first data set comprising a first number of null values and a second number of non-null values, the first number at least an order of magnitude larger than the second number. The method also includes normalizing, by a signal correlator executed by the measurement engine, each non-null value of the second number of non-null values relative to a total of the non-null values of the first data set. The method also includes separating, by the signal correlator, the first data set into a plurality of subsets comprising one or more null values and one or more non-null values. The method further includes, for at least one subset of the plurality of subsets: calculating a difference, by the signal correlator, between the subset and a corresponding subset of a second plurality of subsets generated from a second data set, and writing an identification of the subset as including a signal to a memory device, responsive to the difference exceeding a threshold.

In some implementations, the method includes, for a second subset of the plurality of subsets: calculating a difference, by the signal correlator, between the second subset and a corresponding subset of the second plurality of subsets generated from the second data set, and writing an identification of the second subset as not including a signal to the memory device, responsive to the difference not exceeding the threshold.

In some implementations, the method includes normalizing each non-null value by calculating a logarithm of the non-null value to a base of a sum of the non-null values of the first data set. In other implementations, the first data set and second data set comprise measured null and non-null values for a predetermined plurality of items. In a further implementation, the predetermined plurality of items are grouped into the plurality of subsets; and the method includes separating the first data set into the plurality of subsets by, for each subset, calculating a sum of the non-null values measured for items in the subset. In a still further implementation, the method includes selecting an item of the predetermined plurality of items. In some implementations, the method includes generating, by the signal aggregator, the second data set comprising a third number of null values and a fourth number of non-null values; normalizing, by the signal correlator, each non-null value of the fourth number of non-null values relative to a total of the non-null values of the second data set; and separating, by the signal correlator, the second data set into the plurality of subsets. In still another implementation, the first data set and second data set comprise a plurality of identifications of a number of requests for each of a plurality of media items by a first population and non-overlapping second population, respectively.

In another aspect, the present disclosure is directed to a system for extracting signal differences from a sparse data set signal. The system includes a processor executing a measurement engine comprising a signal aggregator and a signal correlator, and a memory device storing a first data set and a second data set. The signal aggregator is configured to generate the first data set comprising a first number of null values and a second number of non-null values, the first number at least an order of magnitude larger than the second number. The signal correlator is configured to normalize each non-null value of the second number of non-null values relative to a total of the non-null values of the first data set; separate the first data set into a plurality of subsets comprising one or more null values and one or more non-null values; and, for at least one subset of the plurality of subsets: calculate a difference between the subset and a corresponding subset of a second plurality of subsets generated from a second data set, and write an identification of the subset as including a signal to the memory device, responsive to the difference exceeding a threshold.

In some implementations of the system, the signal correlator is further configured to, for a second subset of the plurality of subsets: calculate a difference between the second subset and a corresponding subset of the second plurality of subsets generated from the second data set, and write an identification of the second subset as not including a signal to the memory device, responsive to the difference not exceeding the threshold.

In other implementations, the signal correlator is further configured to calculate a logarithm of the non-null value to a base of a sum of the non-null values of the first data set. In a further implementation, the first data set and second data set comprise measured null and non-null values for a predetermined plurality of items. In a still further implementation, the predetermined plurality of items are grouped into the plurality of subsets; and the signal correlator is further configured to, for each subset, calculate a sum of the non-null values measured for items in the subset. In a still further implementation, the signal correlator is further configured to select an item of the predetermined plurality of items.

In some implementations, the signal aggregator is further configured to generate the second data set comprising a third number of null values and a fourth number of non-null values; and the signal correlator is further configured to: normalize, by the signal analyzer, each non-null value of the fourth number of non-null values relative to a total of the non-null values of the second data set, and separate the second data set into the plurality of subsets.

In some implementations, the first data set and second data set comprise a plurality of identifications of a number of requests for each of a plurality of media items by a first population and non-overlapping second population, respectively.

In yet another aspect, the present disclosure is directed to a non-transitory computer-readable medium storing instructions that, when executed by a processor, cause the processor to: generate a first data set comprising a first number of null values and a second number of non-null values, the first number at least an order of magnitude larger than the second number; normalize each non-null value of the second number of non-null values relative to a total of the non-null values of the first data set; separate the first data set into a plurality of subsets comprising one or more null values and one or more non-null values. Execution of the instructions also cause the processor to, for at least one subset of the plurality of subsets: calculate a difference between the subset and a corresponding subset of a second plurality of subsets generated from a second data set, and write an identification of the subset as including a signal to a memory device, responsive to the difference exceeding a threshold. Execution of the instructions also cause the processor to, for at least one second subset of the plurality of subsets: calculate a difference between the second subset and a corresponding subset of the second plurality of subsets generated from the second data set, and write an identification of the second subset as not including a signal to the memory device, responsive to the difference not exceeding the threshold.

In some implementations, execution of the instructions further cause the processor to calculate a logarithm of the non-null value to a base of a sum of the non-null values of the first data set. In other implementations, the first data set and second data set comprise measured null and non-null values for a predetermined plurality of items, and the predetermined plurality of items are grouped into the plurality of subsets; and execution of the instructions further cause the processor to calculate a sum of the non-null values measured for items in the subset and select an item of the predetermined plurality of items.

In other implementations, execution of the instructions further cause the processor to generate the second data set comprising a third number of null values and a fourth number of non-null values; normalize each non-null value of the fourth number of non-null values relative to a total of the non-null values of the second data set; and separate the second data set into the plurality of subsets.

As discussed above, the above systems and methods may be applied to various types of input data, and accordingly, the output data set may be used for many purposes. For example, in one implementation in which the test and control data sets are radio astronomy data, the output sets may identify stellar regions with non-regular signals. In another implementation in which the test and control data sets are network packets, identified statistically significant subsets of packets may be forwarded or filtered, potentially detecting new network intrusion attempts or information exfiltration attempts. Accordingly, method 300 may continue with selecting and forwarding packets, blocking packets, scheduling transfers, controlling a sensor array, or any other such purposes.

One example use is discussed in more detail below. This example is for illustrative purposes, and is not intended to limit the scope of the systems and methods discussed herein.

In the advertising industry, "lift" is the resulting increase in sales/conversions/other indications of consumer interest that may be attributed to an advertisement, and is a rough measure of the effectiveness of the advertisement. As an indication may follow at any time after a consumer views the advertisement, from seconds to days or weeks with many intervening events, lift is typically difficult to measure. However, as lift is based on objective indicators of interest (e.g. sales, clicks, etc.), it may be more valuable than subjective measures of effectiveness, such as consumer surveys.

An analogue to advertising lift, which measures effectiveness of an advertisement on sales of a product, is media lift, or a measure of effectiveness of an item of media (which may be an advertisement) on consumption of other media. For example, after viewing a first item of media, a viewer may subscribe to a publisher's channel, view other media in the same topic or genre, etc. Identifying additional media that is consumed as a result of lift by the first item of media may be particularly useful for remarketing campaigns: advertisements associated or played with the first item of media may be targeted to users who view the additional media, as they are likely more engaged than users who come across the additional media randomly.

One or more experimental and control groups may be used to identify lift due to exposure to media. An item of content, such as an advertisement, may be shown to a randomly selected subset of users (as an experimental group), while other users (as a control group) are shown a different advertisement. The user groups may be very large, with thousands or hundreds of thousands of users.

Subsequently, media content impressions for all other media are counted for each group, and the resulting totals compared to identify any statistically significant differences. Because of the large number of media items potentially viewed, total counts for any item of media will likely be very low for each group. However, it is likely that at least some items of media will have a significant number of impressions, and a subset of these items may have statistically significant differences between the control group and experimental group, which may be attributed to the item of content under test. To further refine the data, the MapReduce function may be used to group media items into categories or genres, and category impression counts may be compared to identify significant deviations between the groups.

The MapReduce will run over the list of pages visited by both sets of users for a given time period after the date of the potential ad impression. The MapReduce counts two types of events:

First the map reduce will count the total number of unique media content impressions for each piece of media content (an impression is only counted once for each user). Most of the impressions for each specific piece of media content will be so sparse that they will individually be insignificant. There likely will be a few specific pieces of media content that will generate a significant number of impressions; and a subset of these will have a distinguishable number of impressions between the control and experiment groups. The set of these media contents is generated by measuring if the delta between the two groups is above a statistically relevant threshold. In one implementation, this statistically relevant threshold may be calculated based on the statistical significance of the metric (p-value less than 5%). This set of media content can be given to a content publisher as examples of specific videos or other media content to which viewers of a first item of content subsequently viewed. This media content may be the top media content listed in topically relevant search results, media content related to both the initial content and subsequent content viewed by the user, media content embedded on relevant search results, or media content referenced by the initial content itself.

As discussed above, the MapReduce function may be used to reduce the range of entities that must be compared or correlated to calculate statistical significance, which may be particularly important in sparse and large data sets. For each piece of media content collected, the MapReduce function may increment counters for each topic that represents this media content. Some categorization techniques produce floating point scores for the relationship between a specific piece of content and that topic. In these cases, the scores may be used instead of the impression count. The result is a count of the number of times each media content for each topic was visited by users in the control or experiment groups. These topical counts are then compared as above to generate a set of topics with statistically significant deviations between the experiment and control groups. The content publisher is then presented with this set of topics which are typically more useful than the specific videos because they account for the sparse variation in actual media content destinations. In some implementations, a content provider server may select additional media to present to a device based on the identified output subsets. For example, after a first device requests a first item of content, the item of content corresponding to a test data set (e.g. provided to devices in the test data group and not provided to devices in a control group), the content server may provide additional items of content from subsets identified as statistically significant in the test data set.

Figure 4A:
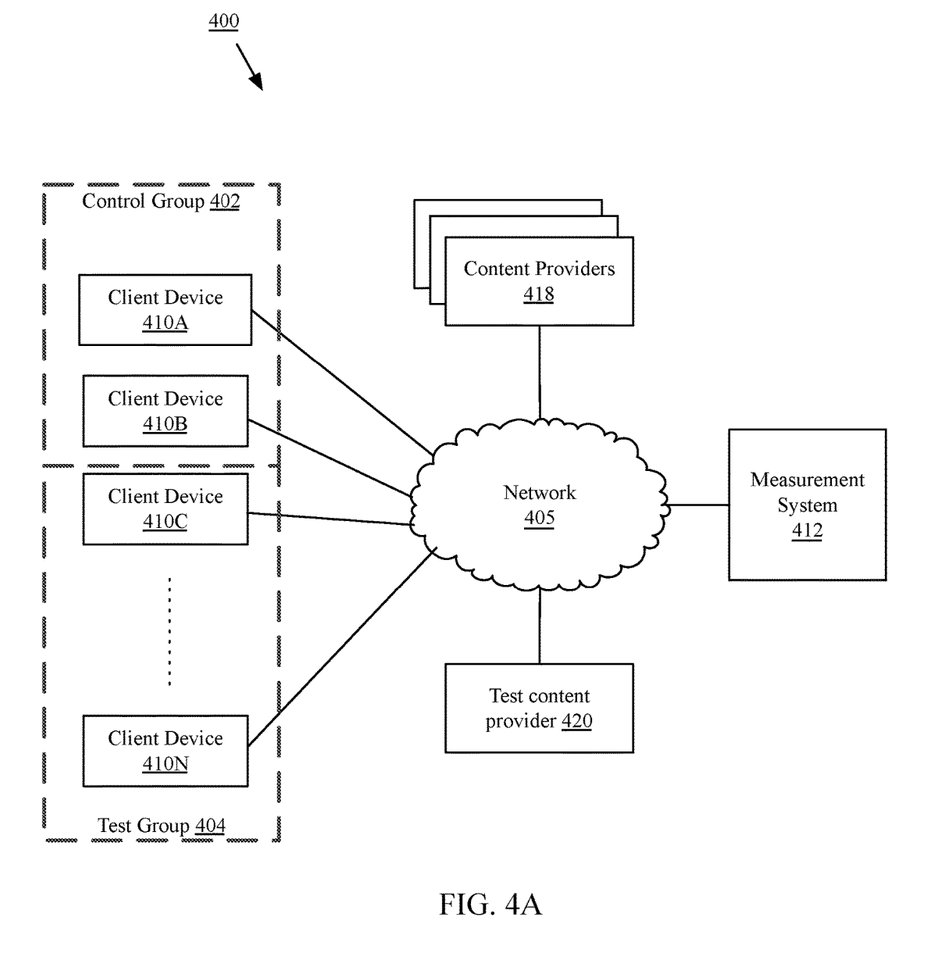
FIG. 4A is a block diagram of a system for extracting signal differences from sparse data sets in one exemplary use case, according to one implementation.

FIG. 4A is a block diagram of a content delivery environment and system for extracting signal differences from sparse data sets in one exemplary use case, according to one implementation. A network 405 may connect one or more client devices 410A-410N (referred to generally as client device(s) 410); content providers 418; test content provider(s) 420; and a measurement system 412. The measurement system 412 may receive content from one or more content providers 418, either directly or via network 405; and/or the content providers 418 may provide content to client devices 410. The audience measurement system 412 may also communicate with a test content provider 420. Although only one measurement system or server 412 and one test content provider 420 are illustrated, in many implementations, a plurality of providers or servers may communicate via one or more networks 405. As discussed above, client devices 410 may be divided into a control group 402 and one (or more) test groups 404. An item of test content may be provided to client devices in the test group 404 and not provided to or restricted from devices in the control group 402. Requests or consumption of additional content from content providers 418 from devices in the control group and test group may be recorded as control and test data sets, respectively.

Still referring to FIG. 4A and in more detail, network 405 may be any form of computer network or combinations of networks that relay information between client devices 410, one or more measurement servers 412, as well as other devices not illustrated. Network 405 may include the Internet and/or other types of data networks, such as a local area network (LAN), a wide area network (WAN), a cellular network, satellite network, or other types of data networks. Network 405 may also include any number of computing devices (e.g., computer, servers, routers, network switches, etc.) that are configured to receive and/or transmit data within network 405. Network 405 may further include any number of hardwired and/or wireless connections. A client device 410 may communicate wirelessly (e.g., via WiFi, cellular, radio, etc.) with a transceiver that is hardwired (e.g., via a fiber optic cable, a CAT5 cable, etc.) to other computing devices in network 405. In some implementations, a network 405 may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Client device(s) 410 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 405. In some implementations, a client device 410 may execute an application, service, server, daemon, routine, or other executable logic for communicating over a network 405, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 405, such as an Ethernet or WiFi interface. In other implementations, client device 410 may receive content via network 405 and may transmit identifications of interactions via network 405.

A content provider 418 may include one or more computing devices connected to network 405 and configured for providing content to a client 410, either directly or via a measurement system 412. Content provider 418 may be referred to variously as a content provider, server, web server, data server, publisher, service provider, or by other similar terms. In many implementations, content provider 418 may include a plurality of computing devices configured as a server farm or cloud, and may include routers, load balancers, network address translators, firewalls, or other such devices. Content providers 418 may be computer servers (e.g., FTP servers, file sharing servers, web servers, etc.) or combinations of servers (e.g., data centers, cloud computing platforms, etc.). Content providers 418 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. Content provider 418 may be an online search engine that provides search result data to client device 410 in response to a search query. In another implementation, content provider 418 may be a first-party web server that provides webpage data to client device 410 in response to a request for the webpage.

An measurement server or system 412 may include one or more computing devices connected to network 405 and configured for measuring and analyzing test and control data sets as discussed above. Measurement server 412 may be referred to variously as a content correlation server, a media lift measurement system, measurement server, server, web server, data server, service provider, or by other similar terms. In many implementations, a measurement server 412 may include a plurality of computing devices configured as a server farm or cloud, and may include routers, load balancers, network address translators, firewalls, or other such devices. In some implementations, a measurement server 412 may be a content provider 418.

In some implementations, a measurement server 412 may receive identifications of requests for content and/or device identifiers from a client 410 via network 405. In one such implementation, a client 410 may execute a plug-in or other application to transmit identifications of requests for content to a measurement server 412. In another implementation, a request for content may be transmitted from client 410 to measurement server 412, which may then redirect the request to an appropriate content provider 418, while recording information about the request. In still another implementation, a request for content may be transmitted from client 410 to a content provider 418, which may respond with the content and embedded instructions causing the client 410 to transmit a second request to the measurement server 412. Content delivered from a content provider, such as a web page, may include an embedded one pixel by one-pixel image with an address of the measurement server 412, such that when a web browser of the client renders the content, the web browser transmits a request for the image to the measurement server 412, potentially including parameters or cookies, device identifiers, or other information.

In other implementations, a measurement server 412 may receive identifications of requests for content and/or device identifiers from a content provider 418. A content provider 418 may execute a measurement agent (not illustrated), which may comprise an application, service, server, daemon, or other executable logic for measuring requests from client devices received by the content provider 418. The measurement agent may transmit identifications of the requests to a measurement server 412, either individually or aggregated.

A test content provider 420 may be a content provider 418 providing an item of content to devices in a test group 404 and not to devices in a control group 402. In some implementations, the item of test content may be additional content, such as an interstitial advertisement, banner advertisement, pop-up advertisement, pre- or post-roll advertisement, or any other such media content. In one implementation, for example, the item of test content may comprise a pilot or test episode of a show, a movie or game trailer, a trailer for a subscription channel, or any other such content. Test content provider 420 may be one of content providers 418 and provide additional non-test content to devices in both control group 402 and test group(s) 404.

In some implementations, demographic information about users of client devices may be collected. In such implementations, the data may be anonymized or disambiguated to protect the privacy of the device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a measurement server. In addition, certain data may be treated in one or more ways before it is stored or used by a measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the measurement servers and content providers.

Figure 4B:
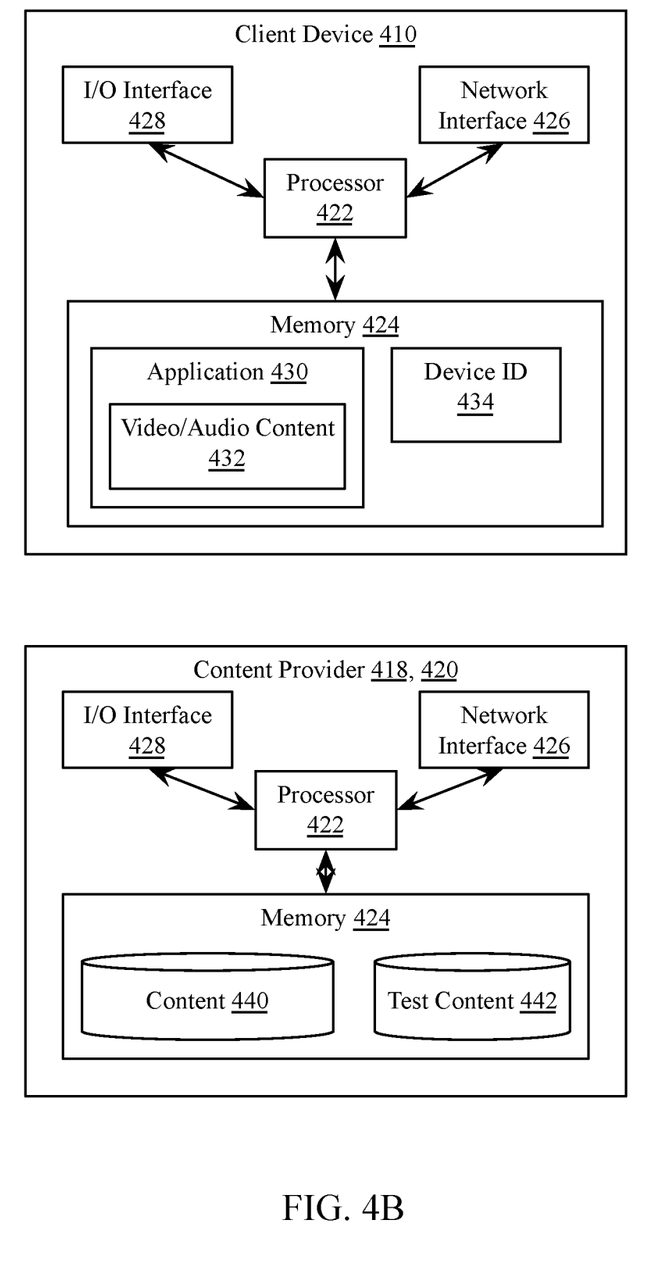
FIG. 4B is a block diagram of devices for use in the system of FIG. 4A, according to some implementations.

FIG. 4B is a block diagram of client and server devices shown in FIG. 4A, according to one implementation. Referring first to client device 410, a client device may be a computing device of a client or other user. Client device 410 may be any number of different types of user electronic devices configured to communicate via network 405, including without limitation, a laptop computer, a desktop computer, a tablet computer, a smartphone, a digital video recorder, a set-top box for a television, a video game console, or any other type and form of computing device or combinations of devices. In some implementations, the type of client device 410 may be categorized as a mobile device, a desktop device or a device intended to remain stationary or configured to primarily access network 405 via a local area network, or another category of electronic devices such as a media consumption device.

In many implementations, client device 410 includes a processor 422 and a memory 424. Memory 424 may store machine instructions that, when executed by processor 422 cause processor 422 to perform one or more of the operations described herein. Processor 422 may include a microprocessor, ASIC, FPGA, etc., or combinations thereof. In many implementations, processor 422 may be a multi-core processor or an array of processors. Memory 424 may include, but is not limited to, electronic, optical, magnetic, or any other storage devices capable of providing processor 422 with program instructions. Memory 424 may include a floppy disk, CD-ROM, DVD, magnetic disk, memory chip, ROM, RAM, EEPROM, EPROM, flash memory, optical media, or any other suitable memory from which processor 422 can read instructions. The instructions may include code from any suitable computer programming language such as, but not limited to, C, C++, C#, Java, JavaScript, Perl, HTML, XML, Python and Visual Basic.

Client device 410 may include one or more network interfaces 426. A network interface 426 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 405. In many implementations, client device 410 may include a plurality of network interfaces 426 of different types, allowing for connections to a variety of networks 405 or a network 405 such as the Internet via different sub-networks. Client device 410 may also include other interfaces for receiving terrestrial, satellite, or cable analog or digital broadcasts, as discussed above.

Client device 410 may include one or more user interface devices 428. A user interface device 428 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 410, such as a built-in display, touch screen, microphone, etc., or external to the housing of client device 410, such as a monitor connected to client device 410, a speaker connected to client device 410, etc., according to various implementations.

Client device 410 may include in memory 424 an application 430 or may execute an application 430 with a processor 422. Application 430 may be an application, applet, script, service, daemon, routine, or other executable logic for receiving content and for transmitting responses, commands, or other data. In one implementation, application 430 may be a web browser, while in another implementation, application 430 may be a video game. Application 430 may include functionality for displaying content received via network interface 426 and/or generated locally by processor 422, and for transmitting interactions received via a user interface device 428, such as requests for websites, selections of survey response options, input text strings, etc.

Application 430 may be a media player or include an embedded media player, such as a plug-in or native media player within a web browser. Application 430 may provide user interfaces for interacting with content 432 played in the media player, such as a skip control, dislike button, or any similar interface.

In some implementations, application 430 may include a data collector or collection agent. A collection agent may include an application plug-in, application extension, subroutine, browser toolbar, daemon, or other executable logic for collecting data processed by application 430. In other implementations, a collection agent may be a separate application, service, daemon, routine, or other executable logic separate from application 430 but configured for intercepting and/or collecting data processed by application 430, such as a screen scraper, packet interceptor, API hooking process, or other such application. A collection agent may be configured for intercepting or receiving data input via user interface device 428, such as Internet search queries, text strings, survey response selections, or other values, or data received and processed by application 430 including websites visited, time spent interacting with a website or application, pages read, or other such data. In many implementations, a collection agent may store some or all of this data or identifiers of such data in a behavior history database or other data structure, and may include identifications of websites visited, web links followed, search queries entered, or other such data. In some implementations, the data may be anonymized or disambiguated to reduce personally identifiable information. In other implementations, the collection agent may be executed by a server, or by an intermediary device deployed between the client and server, such as a router, cable modem, or other such device. Data requests and responses may be parsed by a collection agent executing on an intermediary router as the requests and responses traverse the router. In some implementations, this may allow for monitoring of all data flow to/from a household, without requiring installation of the collection agent on a plurality of devices within the household. In other implementations, as discussed above, a client device 410 may not execute a collection agent; in such implementations, request data may be obtained by a measurement server without the use of a collection agent, such as via embedded images in rendered content, redirected requests, or other such methods.

Client 410 may include or be identified with a device identifier 434. Device identifier 434 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 434 may be fixed to the device or preconfigured in the device, such as a manufacturer serial number or MAC address, while in other implementations, the device identifier 434 may be dynamically set by a content provider or measurement server, application 430, or other entity, such as a cookie or username. In some implementations, a unique or new device identifier 434 may be set for each communication to a content provider and/or measurement server, while in other implementations, the device identifier 434 may not be changed, or may be changed periodically (e.g. hourly, daily, weekly, etc.) or at other intervals (e.g. on restart of the client device, login to an internet service, etc.). In some implementations, a device identifier 434 may be associated with one or more other device identifiers 434 (e.g., a device identifier for a mobile device, a device identifier for a home computer, etc.). In many implementations, as discussed above, a device identifier 434 may be generated and/or transmitted to the device 410 by a content provider. In other implementations, as discussed above, client 410 may request a device identifier or cookie 434 from a measurement server or content provider, and may transmit the device identifier or cookie 434 to the measurement server or content provider in association with requests for content.

Also illustrated in FIG. 4B is a block diagram of an implementation of a content provider 418, 420, broadcast provider, or similar device. As with client devices 410, server 418, 420 may include one or more processors 422, memories 424, network interfaces 426, and user interfaces 428. In some implementations referred to as headless servers, a server 418, 420 may not include a user interface 428, but may communicate with clients 410 with user interfaces 428 via a network 405. Memory 424 may include content storage 440, such as storage of webpages, images, audio files, video files, data files, or any other type and form of data. Memory 424 may also include storage of test content 442. In some implementations, memory 424 may store one or more applications (not illustrated) for execution by processor 422 of the server, including FTP servers, web servers, mail servers, file sharing servers, peer to peer servers, or other such applications for delivering content stored in content storage.

As discussed above, in many such implementations, any collected data may be anonymized or disambiguated to protect the privacy of individuals. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a measurement server. In addition, certain data may be treated in one or more ways before it is stored or used by a measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the measurement servers and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for calculating signal differences from a sparse data set signal, comprising:
generating, by a signal aggregator executed by a measurement engine of a computing device, a first data set comprising a first number of null values and a second number of non-null values, the first number at least an order of magnitude larger than the second number;
normalizing, by a signal correlator executed by the measurement engine, each non-null value of the second number of non-null values relative to a total of the non-null values of the first data set;
separating, by the signal correlator, the first data set into a plurality of subsets comprising one or more null values and one or more non-null values; and
for at least one subset of the plurality of subsets:
calculating a difference value, by the signal correlator, between the at least one subset and a corresponding subset of a second plurality of subsets generated from a second data set, the difference value indicating a level that first characteristics of the at least one subset differs from second characteristics of the corresponding subset; and
writing an identification of the subset as including a signal to a memory device, responsive to the difference value exceeding a threshold.

2. The method of claim 1, further comprising, for a second subset of the plurality of subsets:
calculating a second difference value, by the signal correlator, between the second subset and a second corresponding subset of the second plurality of subsets generated from the second data set; and
writing an identification of the second subset as not including a signal to the memory device, responsive to the difference value not exceeding the threshold.

3. The method of claim 1, wherein normalizing each non-null value comprises calculating a logarithm of the non-null value to a base of a sum of the non-null values of the first data set.

4. The method of claim 1, wherein the first data set and second data set comprise measured null and non-null values for a predetermined plurality of items.

5. The method of claim 4, wherein the predetermined plurality of items are grouped into the plurality of subsets;
wherein separating the first data set into the plurality of subsets comprises, for each subset, calculating a sum of the non-null values measured for items in the subset.

6. The method of claim 5, further comprising selecting an item of the predetermined plurality of items.

7. The method of claim 1, further comprising:
generating, by the signal aggregator, the second data set comprising a third number of null values and a fourth number of non-null values;
normalizing, by the signal correlator, each non-null value of the fourth number of non-null values relative to a total of the non-null values of the second data set; and
separating, by the signal correlator, the second data set into the plurality of subsets.

8. The method of claim 1, wherein the first data set and second data set comprise a plurality of identifications of a number of requests for each of a plurality of media items by a first population and non-overlapping second population, respectively.

9. A system for calculating signal differences from a sparse data set signal, comprising:
a processor executing a measurement engine comprising a signal aggregator and a signal correlator, and a memory device storing a first data set and a second data set;
wherein the signal aggregator is configured to generate the first data set comprising a first number of null values and a second number of non-null values, the first number at least an order of magnitude larger than the second number; and
wherein the signal correlator is configured to:
normalize each non-null value of the second number of non-null values relative to a total of the non-null values of the first data set,
separate the first data set into a plurality of subsets comprising one or more null values and one or more non-null values, and
for at least one subset of the plurality of subsets:
calculate a difference value between the at least one subset and a corresponding subset of a second plurality of subsets generated from a second data set, the difference value indicating a level that first characteristics of the at least one subset differs from second characteristics of the corresponding subset; and
write an identification of the subset as including a signal to the memory device, responsive to the difference value exceeding a threshold.

10. The system of claim 9, wherein the signal correlator is further configured to, for a second subset of the plurality of subsets:
calculate a second difference value between the second subset and a corresponding subset of the second plurality of subsets generated from the second data set; and
write an identification of the second subset as not including a signal to the memory device, responsive to the second difference value not exceeding the threshold.

11. The system of claim 9, wherein the signal correlator is further configured to calculate a logarithm of the non-null value to a base of a sum of the non-null values of the first data set.

12. The system of claim 9, wherein the first data set and second data set comprise measured null and non-null values for a predetermined plurality of items.

13. The system of claim 12, wherein the predetermined plurality of items are grouped into the plurality of subsets;
wherein the signal correlator is further configured to, for each subset, calculate a sum of the non-null values measured for items in the subset.

14. The system of claim 13, wherein the signal correlator is further configured to select an item of the predetermined plurality of items.

15. The system of claim 9, wherein the signal aggregator is further configured to generate the second data set comprising a third number of null values and a fourth number of non-null values; and
wherein the signal correlator is further configured to:
normalize, by the signal analyzer, each non-null value of the fourth number of non-null values relative to a total of the non-null values of the second data set, and
separate the second data set into the plurality of subsets.

16. The system of claim 9, wherein the first data set and second data set comprise a plurality of identifications of a number of requests for each of a plurality of media items by a first population and non-overlapping second population, respectively.

17. A non-transitory computer-readable medium storing instructions that, when executed by a processor, cause the processor to:
- generate a first data set comprising a first number of null values and a second number of non-null values, the first number at least an order of magnitude larger than the second number;
- normalize each non-null value of the second number of non-null values relative to a total of the non-null values of the first data set;
- separate the first data set into a plurality of subsets comprising one or more null values and one or more non-null values;
- for at least one subset of the plurality of subsets:
  - calculate a difference value between the at least one subset and a corresponding subset of a second plurality of subsets generated from a second data set, the difference value indicating a level that first characteristics of the at least one subset differs from second characteristics of the corresponding subset; and
  - write an identification of the subset as including a signal to a memory device, responsive to the difference value exceeding a threshold; and
- for at least one second subset of the plurality of subsets:
  - calculate a second difference value between the second subset and a second corresponding subset of the second plurality of subsets generated from the second data set, the second difference value indicating a second level that third characteristics of the at least one second subset differs from fourth characteristics of the second corresponding subset; and
  - write an identification of the second subset as not including a second signal to the memory device, responsive to the second difference value not exceeding the threshold.

18. The computer readable medium of claim 17, wherein execution of the instructions further cause the processor to calculate a logarithm of the non-null value to a base of a sum of the non-null values of the first data set.

19. The computer readable medium of claim 17, wherein the first data set and second data set comprise measured null and non-null values for a predetermined plurality of items, and wherein the predetermined plurality of items are grouped into the plurality of subsets;
- wherein execution of the instructions further cause the processor to calculate a sum of the non-null values measured for items in the subset and select an item of the predetermined plurality of items.

20. The computer readable medium of claim 17, wherein execution of the instructions further cause the processor to generate the second data set comprising a third number of null values and a fourth number of non-null values;
- normalize each non-null value of the fourth number of non-null values relative to a total of the non-null values of the second data set; and
- separate the second data set into the plurality of subsets.

* * * * *